(12) United States Patent
Fludger et al.

(10) Patent No.: US 6,556,343 B1
(45) Date of Patent: Apr. 29, 2003

(54) OPTICAL FIBER DEVICE

(75) Inventors: Christopher Fludger, South Croydon (GB); Kevin J Cordina, Bishops Stortford (GB); Jonathan King, Epping (GB)

(73) Assignee: Bookham Technology plc, Abingdon (GB)

( * ) Notice: Subject to any disclaimer, the term of this patent is extended or adjusted under 35 U.S.C. 154(b) by 156 days.

(21) Appl. No.: 09/653,985

(22) Filed: Sep. 1, 2000

(51) Int. Cl.$^7$ .................................................. H01S 3/00
(52) U.S. Cl. .................................. 359/341.3; 372/38.06
(58) Field of Search ...................... 359/341.3, 341.32; 372/38.06, 70

(56) References Cited

U.S. PATENT DOCUMENTS

| | | | |
|---|---|---|---|
| 4,001,704 A | * 1/1977 | Danielmeyer et al. | 330/4.3 |
| 4,678,327 A | 7/1987 | Yoshida | 356/73.1 |
| 4,955,685 A | * 9/1990 | Garman | 350/96.3 |
| 5,048,026 A | * 9/1991 | Shaw et al. | 372/6 |
| 5,373,576 A | * 12/1994 | Minns et al. | 385/125 |
| 5,517,315 A | 5/1996 | Snail | 356/445 |
| 5,929,994 A | 7/1999 | Lee | 356/364 |

* cited by examiner

*Primary Examiner*—Mark Hellner
(74) *Attorney, Agent, or Firm*—Lahive & Cockfield, LLP

(57) ABSTRACT

An optical fiber amplifier or laser comprises an optical housing having a diffusive reflective inner surface and at least one opening for receiving pump light. An optical fiber having a doped core is at least partially contained within the optical housing. The optical fiber can be pumped by an optical source without the need for any complex or expensive optical couplers. Lateral illumination of the fiber core with pump light enables many fibers to be pumped by the same pump source, so that a separate dedicated coupler is no longer required to couple the pump light into each optical cable.

15 Claims, 4 Drawing Sheets

OPTICAL FIBER DEVICE

FIELD OF THE INVENTION

The present invention relates to an optical fiber device such as an optical fiber laser or an optical fiber amplifier. The invention is particularly suitable for use as a fiber amplifier in a multi-fiber cross-connect in an optical communications system.

BACKGROUND OF THE INVENTION

Conventional Erbium-doped fiber amplifiers use single mode, single clad fiber, pumped with single mode pumps. Recently, high power amplifiers have become available which use double-clad fibers. High power multi-mode pump-light from an optical source can then be coupled into the inner cladding of the optical fiber. In both cases, interactions with the doped core of the optical fiber cause excitation of the atoms of the dopant material. As an optical signal propagates along the length of the fiber, stimulated emission occurs as the excited Erbium dopant decays, thereby amplifying the passing signal.

As mentioned above, the present invention is not limited to fiber amplifiers and also applies, for example, to optical fiber lasers. These are similar to fiber amplifiers in construction, although reflectors are additionally included arranged at positions along the optical fiber to define a laser cavity in the optical fiber so as to generate a laser output when the fiber is pumped.

In order to couple pump light into the cladding of the optical fiber, dedicated fiber couplers (usually one per fiber) are required, which introduce loss to the system and result in significant cost. Multi-mode pump lasers can be used with double clad fiber. These allow higher power multimode lasers to be used (which may be multiplexed using a bundle), but one semiconductor laser is required per fiber laser or amplifier.

There is increasing interest in all-optical switching devices for use in nodes of optical communications networks. These devices comprise optical cross connects, which enable a large number of input signals to be routed selectively to a corresponding number of outputs. Each input and output is carried by a respective fiber, and the signal on each fiber is preferably amplified to compensate for attenuation which occurs in the cross connect. 1024×1024 optical cross connects are being developed, requiring a large number of amplifiers. The need for dedicated fiber couplers adds substantial complexity and cost. There are numerous other applications where a large fiber bundle is present, with the signals on each fiber requiring amplification. These include cable television applications.

SUMMARY OF THE INVENTION

According to the present invention, there is provided an optical device, comprising:
   an optical housing having a diffusive reflective inner surface and at least one opening for receiving pump light;
   an optical fiber having a doped core at least partially contained within the optical housing.

The invention provides an optical device which enables an optical fiber to be pumped by an optical source without the need for any complex or expensive optical couplers. Pump light is provided to the doped core by uniform illumination around the fiber rather than by an end feed arrangement. This lateral illumination enables many fibers to be pumped by the same pump source, so that in multi-fiber applications, a separate dedicated coupler is no longer required to couple the pump light into each optical cable. Preferably, therefore, the device comprises a plurality of doped optical fibers a part of each of which is contained within the optical housing. This enables the plurality of optical fibers to be provided with pump light simultaneously, without requiring individual couplers. A low cost high power diode may be used to pump the multiple amplifiers simultaneously. The cost and complexity of the multi-fiber pumped optical systems can be greatly reduced. The invention also enables multimode semiconductor pump lasers to be employed without requiring double-clad fibers to be used.

In one example, the device is an optical fiber laser, further comprising a first reflector arranged at a first position along the optical fiber and, a second reflector arranged at a second position along the optical fiber wherein the optical fiber between the first and second reflectors defines a lasing cavity of the laser and wherein at least part of the lasing cavity is contained within the housing, the second reflector being a partial reflector to allow a laser output from the fiber laser.

In another example, the device is an optical amplifier suitable for use in amplifying the signals in a large number of optical fibers simultaneously. This enables amplification to be provided cheaply and conveniently to the signals in fibers at an optical cross-connect.

Preferably, the device further comprises an optical source arranged at the opening of the optical housing to provide pump light to the optical housing. Any suitable device may be used as the optical source. Examples include a high power (of the order of Watts) multi-mode diode or multi-mode diode bar laser. These devices are low cost and power efficient.

In one example, the optical housing is a cylinder having substantially parallel upper and lower surfaces and a connecting surface connecting the upper and lower surfaces, and in which the inner surface of the connecting surface has a diffusive reflective coating. Alternatively, the optical housing may be a sphere or any other suitable integrating geometry. The cylinder configuration enables a large number of amplifiers to be provided in a relatively small volume.

According to a second aspect of the present invention, there is provided an optical communications system, comprising an optical cable having a plurality of optical fibers and one or more optical amplifiers arranged at positions along the optical cable, wherein at least one of the optical amplifiers comprises an optical housing having a diffusive reflective inner surface and at least one opening for receiving pump light, wherein a plurality of doped optical fibers are at least partially contained within the optical housing, the doped optical fibers being coupled to the optical fibers of the optical cable.

The benefits of reducing the volume required for amplifying the signals in a multi-fiber communications system enable systems to be designed and built with a greater number of fibers, increasing the overall system information carrying capacity.

According to a further aspect of the present invention, there is provided a method of amplifying a signal propagating in an optical fiber, at least part of the optical fiber being contained within an optical housing, the optical housing defining a volume having a diffusive reflective inner surface, comprising the step of:
   providing pump light from an optical source to said optical housing, the pump light reflecting off the diffusive reflective inner surface and substantially uniformly illuminating the volume thereby pumping the optical fiber, to amplify the optical signal.

According to a further aspect of the present invention, there is provided a method of generating a laser output from an optical fiber having a first and second reflector arranged at positions along the fiber defining a laser cavity in the optical fiber, at least part of the laser cavity being contained within an optical housing, the optical housing defining a volume having a diffusive reflective inner surface, comprising the step of:

providing pump light from an optical source to said optical housing, the pump light reflecting off the diffuse reflective inner surface and substantially uniformly illuminating the volume thereby pumping the laser cavity of the optical fiber to generate a laser output.

BRIEF DESCRIPTION OF THE DRAWINGS

Examples of the present invention will now be described in detail with reference to the accompanying drawings, in which.

DETAILED DESCRIPTION

Figure 1:
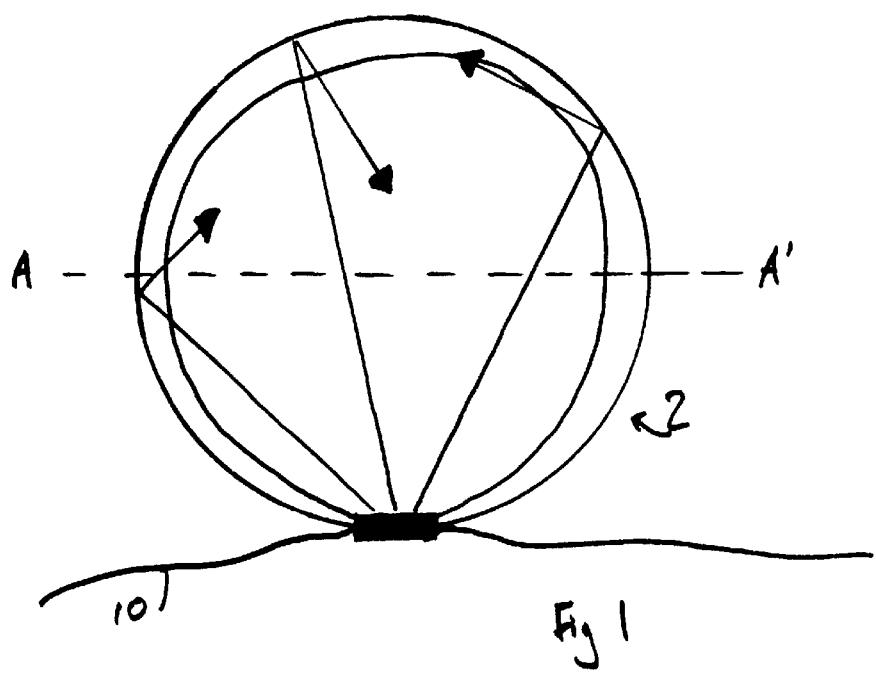
FIG. 1 shows an example of a plan view of an optical amplifier according to the present invention.
Figure 2:
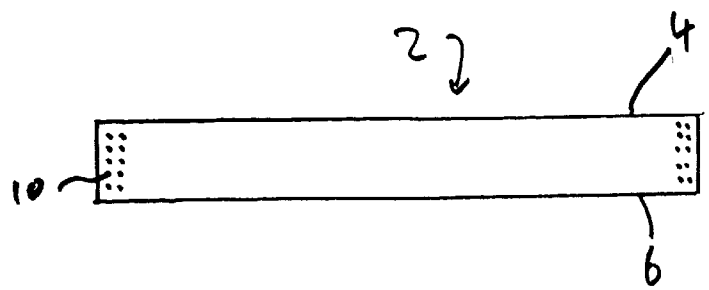
FIG. 2 shows a section along the line AA' of FIG. 1.
Figure 3:
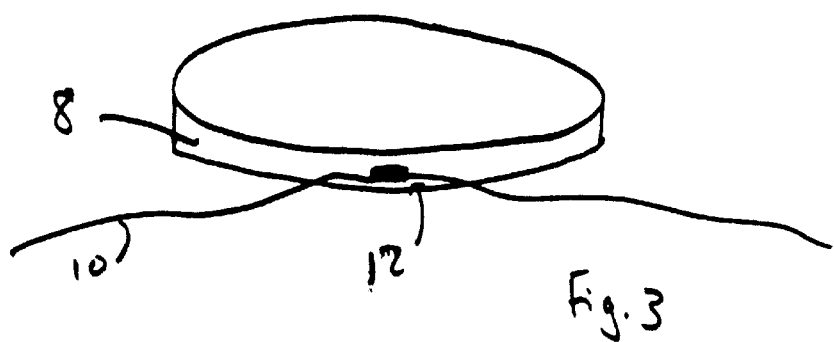
FIG. 3 shows a perspective view of the amplifier of FIGS. 1 and 2.

FIGS. 1 to 3 show respectively a plan view, a sectional view and a perspective view of an optical amplifier according to the present invention. For clarity in FIGS. 1 and 3, only a single optical fiber is shown although in practice the device is likely to be a multi-fiber amplifier. In this example, the amplifier is in the form of a disc defining an optical housing 2. The housing 2 comprises parallel upper and lower surfaces 4 and 6 and a side wall 8 of generally cylindrical shape functioning as a connecting surface provided between the surfaces 4 and 6.

An opening (not shown) is provided in the side wall 8 to enable an optical fiber 10 (or a fiber bundle) to enter and leave the housing 2. As will be explained below, pump light is to be absorbed through the side of the fiber rather than by coupling to an end face, and so the fiber preferably has a single cladding layer. In addition, an optical source 12 is provided at the opening of the housing to provide pump light for the amplifier. The housing 2 has a diffusive reflective inner surface which ensures that light provided to the disc from the opening is scattered to provide a uniform illumination of the volume within the disc. The housing 2 can be made of a suitable material to provide the diffusive reflectivity, or else a suitable coating may be applied to the inner surface of the housing.

In the example shown in FIGS. 1 to 3, the optical source 12 is provided over the opening through which the fiber enters the housing thus limiting the number of openings in the housing. This has the effect of increasing the efficiency of the device as this reduces the number of possible areas from which unabsorbed pump light can leak out of the housing 2. It is however possible to provide dedicated openings for each of the optical fiber or fibers 10 and optical source 12.

The dimensions of the disc are variable in dependence on the specific application in which the amplifier is to be used. For example, if amplification of signals in a large number of fibers is required, the dimensions of the disc can be appropriately increased. Typically, for an amplifier capable of receiving 1024 optical fibers the diameter of the disc would be in the range 15 to 30 cm and appropriate values for the height of the side wall 8 would be 3 to 10 mm.

The 1024 fibers may be arranged as a block, for example of approximately 10 by 100 fibers. Each fiber may have a typical diameter of 0.125 mm, so that this block requires an opening slit of dimensions 1.25 mm by 12.5 mm. Two such slits would be required, one for the passage into the cavity and one for the passage out of the cavity.

The disc operates as an integrating unit which produces a uniform diffuse light within the disc to enable absorption of the pump light through side walls of the optical fibers. Accordingly, no expensive or complex coupling devices are required.

It is important that as much of the volume of the disc as possible is illuminated with light from the optical source. To achieve this, the inner surface of side wall 8 is selected to have a diffusive reflectivity (i.e. to cause non-specular reflection of incident light) at the wavelength of the pump light. This may be a property of the material of the side wall or else the side wall 8 may be coated with an appropriate material. A typical value for the reflectivity of the side wall 8 of the disc is in the region of 99% and a diffusive reflector such as a gold film may be used as the coating. The diffusive reflective nature of the inner surface of the optical housing ensures that the volume of the optical housing is uniformly illuminated when pump light is provided. Alternative suitable materials for the side wall 8 will be apparent to those skilled in the art.

The reflectivity of the upper and lower surfaces 4 and 6 is selected to be higher than that of the side wall 8 and is typically between 99.5 and 99.8%. To achieve this, the upper and lower surfaces may be polished gold reflectors or polished reflectors made from other suitable materials. The selected reflectivities of the side wall 8 and upper and lower surfaces 4 and 6 ensure that a high number of pump passes occur which increases the efficiency of the amplifier. In addition, in this example, the cylindrical symmetry, the high number of pump passes and multiple scattering from the side wall 8 ensures that the pump source is able to uniformly illuminate the volume of the disc.

Speckle effects and dark zone effects which are caused by interference between light reflected from the diffusive reflective surface of the side wall 8 can be overcome by introducing a dither to the pump source output. A dither in the region of 50 to 150 MHz is sufficient to provide spatial de-coherence of the pump source output.

In the C-band wavelength range, the typical absorption of pump light for standard Erbium doped fiber is 8 dB/m and the gain that this absorption produces in an optical signal at the appropriate wavelength is around 2 dB/m. In an example of an optical amplifier according to the invention where there are 1024 optical fibers at an optical cross-connect (described further below), the gain requirements are approximately 4 to 8 dB. To provide this gain, each optical fiber would have to be 2 to 4 m long i.e. 4 to 8 turns per Er fiber for an average turn radius of 7.5 cm. The total fiber length of fiber in the disc is then 2 to 4 km. This is achievable with a flattened fiber torus approximately 800 fibers deep and 5 to 10 fibers high. The diameter of the inner cladding of standard Er doped fiber is approximately 125 micrometers, so that a depth of 800 fibers corresponds to a dimension of 10 cm, which clearly enables the torus to fit into a cylinder of 30 cm diameter.

The efficiency of such an amplifier is also acceptable for the necessary requirements. In the amplifier, the dominant loss mechanism is the absorption of the pump light by the Erbium in the doped fiber core, which typically has an absorption of approximately 7 to 10 dB/m compared to approximately 0.1 to 0.3 dB/m for the fiber cladding. The effective pump loss L due to absorption in the fiber for pump light traversing the torus satisfies the following equation:

L=(Number of fibers across torus)×(core diameter)×(loss per meter of fiber)×(ratio of core diameter to core spacing in torus).

This equation takes calculates the loss if the light traverses the core of every fiber, and then scales this according the ratio of core to cladding diameter, which provides an expected number of cores that will, on average, be traversed. The loss through the cladding layer is ignored.

In the example given above of a torus 800 fibers deep with a loss of 8 dB per meter, this gives value of approximately 0.004 dB loss per traverse. This compares with 0.05 dB loss for a 99% reflector (surfaces 4 and 6) so that the pump absorption contributes only 8% of the total pump loss. Increasing the dopant level in the fiber core or reducing the diameter of the fiber inner cladding would improve this figure.

The amplifier of the present invention is suitable for use in applications where lossless optical components are required. As explained above, the invention ensures that couplers are not needed to couple light from the pump source into the optical fiber(s). Therefore the losses associated with such couplers are removed. Applications of the invention include use in a lossless demultiplexer where each demultiplexed channel is carried by a different optical fiber. The signal on each of the fibers is then amplified as described above. To provide control of the relative amplification provided to each channel, variable optical attenuators can be coupled to each of or selected ones of the optical fibers.

Figure 4:
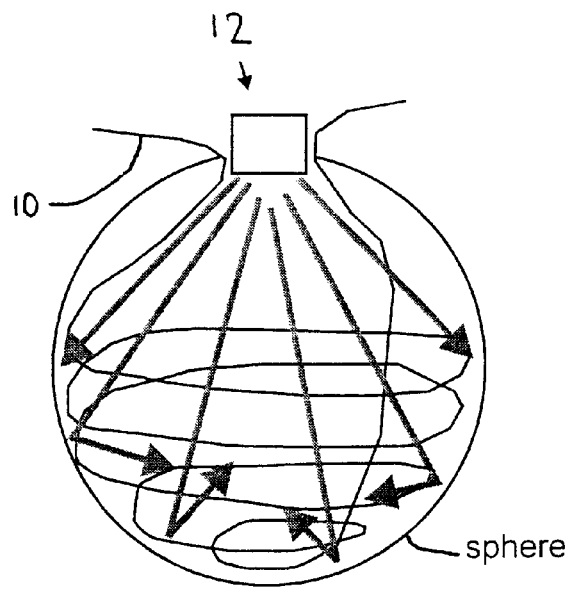
FIGS. 4 and 5 show further examples of optical amplifiers according to the present invention.
Figure 5:
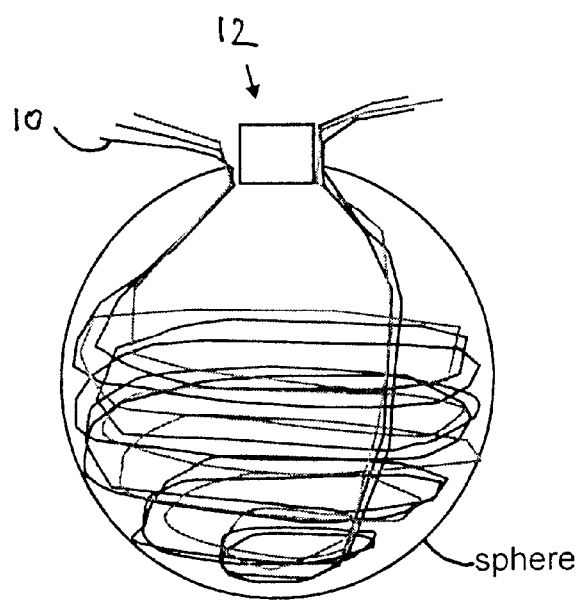

FIGS. 4 and 5 show further examples of optical amplifiers according to the present invention. In these examples, a spherical housing is used as the optical reflective cavity. The same effects are used to provide amplification of an optical signal propagating through the optical fibers 10. FIG. 4 shows a single fiber 10, whereas FIG. 5 illustrates a fiber bundle. In these examples, a single opening is shown, which provides the fiber inlet, the fiber outlet and the opening for pump light.

Although a sphere and disc have been shown above, any suitable integrating geometry could be used.

Figure 7:
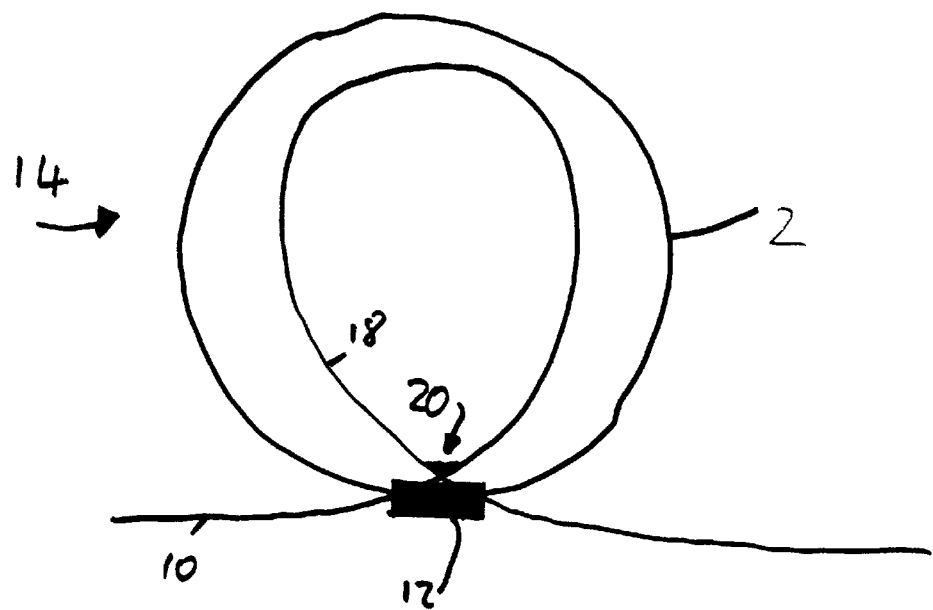
FIGS. 6 and 7 show examples of optical fiber lasers according to the present invention.
Figure 6:
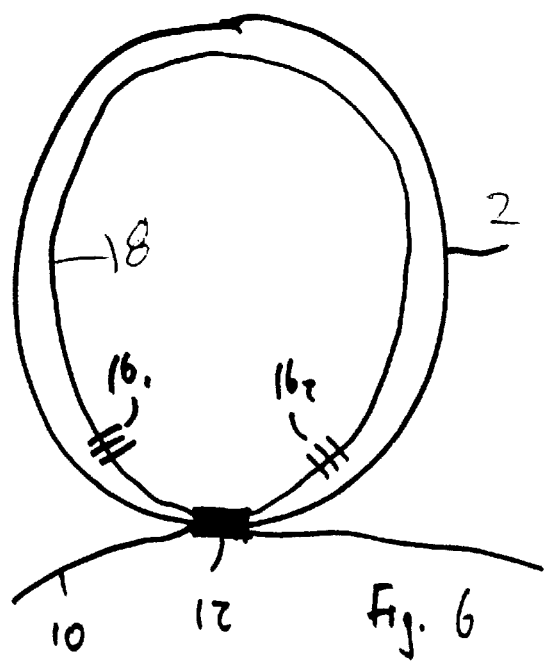

As mentioned above, it is possible to use the device of the present invention as a fiber laser as well as a fiber amplifier. FIGS. 6 and 7 show examples of fiber lasers according to the present invention. Referring to FIG. 6, a fiber laser 14 is shown having an optical fiber 10 having a suitably doped core arranged in housing 2. As in the amplifier described above, an optical source 12 is provided to transmit light into the housing 2 to pump the core of the optical fiber 10. A pair of Bragg fiber gratings $16_1$ and $16_2$ are provided which define a laser cavity 18 within the fiber 10. As excited electrons in the Erbium doped core of the fiber decay, light is produced which is fed back into the cavity by one of the reflectors $16_1$ and $16_2$ causing lasing to occur.

In the example shown in FIG. 7, a fused fiber coupler 20 is used as the feed back mechanism to define the laser cavity. This may be housed outside the housing. One or more attenuators and/or optical isolators may again be provided to control the output of the laser.

The device of the invention enables a plurality of fiber lasers to be pumped using a single source and with a single device. Thus, a plurality of laser outputs can be provided, and each of these may be used for pumping individual conventional optical amplifiers.

Figure 8:
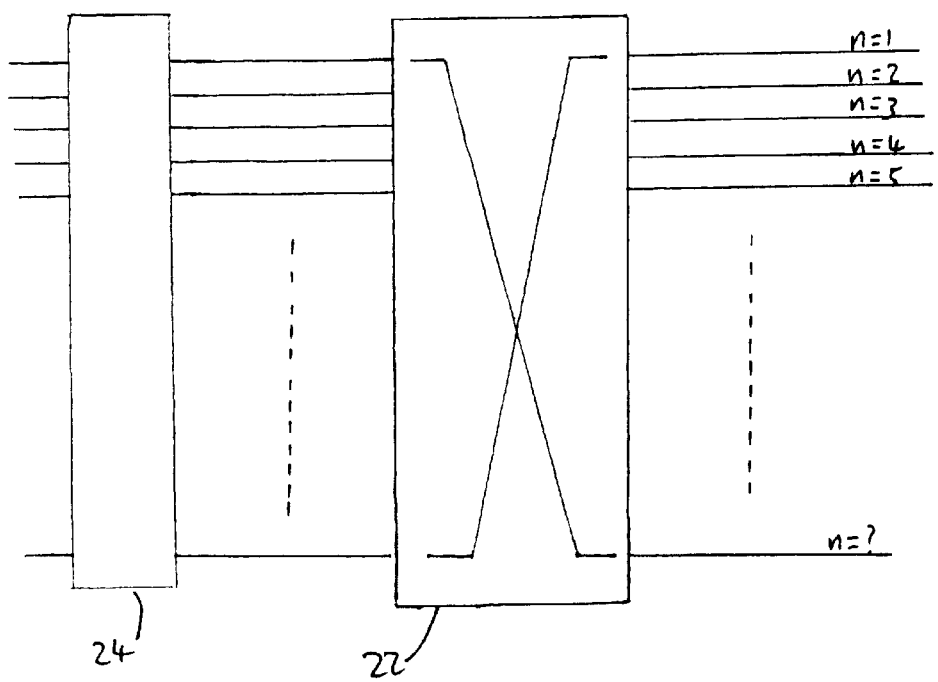
FIG. 8 shows an example of an optical cross-connect coupled to an amplifier according to the present invention; and, FIG. 9 shows an example of an optical communications system according to the present invention.

FIG. 8 shows an example of an optical cross-connect 22 arranged to receive inputs from a number n of optical fibers and couple signals from selected ones of the fibers to predetermined output fibers in accordance with a control mechanism (not shown). An optical amplifier 24 according to the present invention is provided to amplify the signals in each of the optical fibers. Conventionally, a separate amplifier would have been required for each of the optical fibers. The amplifier of the present invention is able to amplify the signals in all of the optical fibers simultaneously. The number of fibers connected to the cross connect may range from 2 upwards, with practical considerations limiting the maximum size of optical cross connects.

Figure 9:
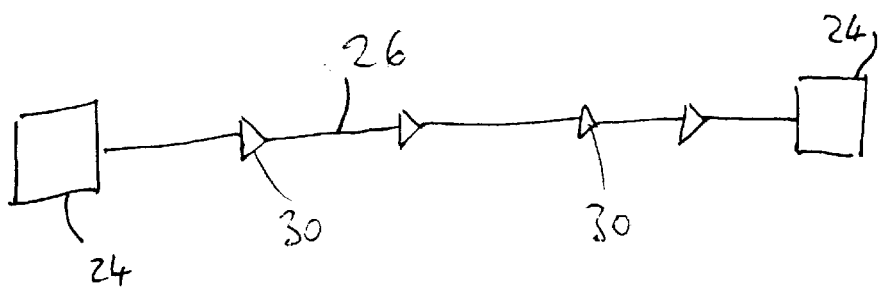

FIG. 9 shows an example of an optical communications system according to the present invention. The system includes an optical cable 26 coupled between first and second end stations 24. A number of optical amplifiers 30 are provided at positions along the optical cable 26 to amplify propagating signals. At least one of the amplifiers is an amplifier according the present invention. The amplifier of the present invention is suitable for amplifying the signals in a large number of optical cables simultaneously, and thereby enables the corresponding number of fibers in the communications system to be increased without significant additional expense. The communications system capacity can therefore be increased with little additional overhead.

We claim:

1. An optical device, comprising:
   an optical housing having a diffusive reflective inner surface and at least one opening into said housing for receiving pump light;
   an optical fiber having a doped core at least partially contained within the optical housing; and
   an optical source arranged at the opening of the optical housing to provide pump light to the optical housing.

2. An optical device according to claim 1, in which the optical source is a multimode light source.

3. An optical device according to claim 1, in which the optical fiber is a single mode optical fiber.

4. An optical device according to claim 1, in which the optical fiber has a core and a cladding layer, the absorption of the cladding layer being in the range of 0.1 to 0.3 dB/m and the absorption of the core being greater than 5 dB/m.

5. An optical device according to claim 1, in which the optical housing is a sphere.

6. An optical device according to claim 1, comprising a plurality of doped optical fibers each of which is at least partially contained within the optical housing.

7. An optical device according to claim 1, in which the optical housing is a cylinder having substantially parallel upper and lower surfaces and a side wall connecting the upper and lower surfaces, and in which the inner surface of the side wall is diffusely reflective.

8. An optical device according to claim 7, in which the cylinder has circular upper and lower surfaces.

9. An optical device according to claim 1, in which the inner surface of the optical housing is made of a material having diffuse reflectivity.

10. An optical device according to claim 1, in which the device is an optical amplifier.

11. A method of amplifying a signal propagating in an optical fiber, at least part of the optical fiber being contained within an optical housing, the optical housing defining a volume having a diffusive reflective inner surface and having an opening into said volume, the method comprising the step of:

providing pump light from an optical source located at said opening into said optical housing, the pump light reflecting off the diffusive reflective inner surface and substantially uniformly illuminating the volume thereby pumping the optical fiber, to amplify the optical signal.

12. An optical device according to claim 1, wherein:

an optical source is arranged at the opening of the optical housing to provide pump light to the optical housing, and wherein the optical fiber includes a first reflector arranged at a first position along the optical fiber and a second reflector arranged at a second position along the optical fiber, wherein the optical fiber between the first and second reflectors defines a lasing cavity, and wherein at least part of the lasing cavity is contained within the optical housing, the second reflector being a partial reflector to allow a laser output from the optical fiber.

13. A method of providing a pump signal to an optical fiber, at least part of the optical fiber being contained within an optical housing, the optical housing defining a volume having a diffusive reflective inner surface and having an opening into said volume, the method comprising the steps of:

providing pump light from an optical source located at said opening into said optical housing;

reflecting the pump light off the diffusive reflective inner surface and substantially uniformly illuminating the volume;

pumping the optical fiber with the substantially uniform illumination.

14. A method as claimed in claim 13, wherein the pump signal is for amplifying a signal propagating in the optical fiber.

15. A method as claimed in claim 13, wherein the optical fiber has a first and second reflector arranged at positions along the fiber defining a laser cavity in the optical fiber, and wherein the pump signal is for generating a laser output.

* * * * *